US007871088B2

(12) United States Patent
Silva et al.

(10) Patent No.: US 7,871,088 B2
(45) Date of Patent: Jan. 18, 2011

(54) CARGO CART FOR WHEELED MOBILITY DEVICE

(75) Inventors: José Freitas Silva, Jamul, CA (US); Angus R. Colson, Jr., Jamul, CA (US); Hugh Williams, Oceanside, CA (US); Gavin K. Wong, Solana Beach, CA (US); Keith W. Reynolds, Cardiff, CA (US)

(73) Assignee: José Silva, Jamul, CA (US)

( * ) Notice: Subject to any disclaimer, the term of this patent is extended or adjusted under 35 U.S.C. 154(b) by 352 days.

(21) Appl. No.: 12/002,707

(22) Filed: Dec. 18, 2007

(65) Prior Publication Data

US 2009/0152827 A1 Jun. 18, 2009

(51) Int. Cl.
*B62D 39/00* (2006.01)

(52) U.S. Cl. ............... 280/33.998; 280/63; 280/47.35; 135/66

(58) Field of Classification Search ........... 280/12.11, 280/33.991, 33.992, 47.34, 47.35, 219, 404, 280/651, 655, 87.021, 87.041, 87.051, 47.17; 135/66, 67, 85
See application file for complete search history.

(56) References Cited

U.S. PATENT DOCUMENTS

| 2,625,407 | A | | 1/1953 | Vamer | |
|---|---|---|---|---|---|
| 2,626,652 | A | * | 1/1953 | Steigler | 280/87.051 |
| D169,337 | S | * | 4/1953 | Reece | D34/21 |
| 2,854,686 | A | * | 10/1958 | Hansen | 15/327.5 |
| 3,102,648 | A | * | 9/1963 | Hughes | 414/449 |
| 3,162,462 | A | * | 12/1964 | Elders | 280/47.35 |
| 3,191,956 | A | | 6/1965 | Rizzuto | 280/641 |
| 3,197,224 | A | * | 7/1965 | Kappen | 280/651 |
| 3,310,317 | A | * | 3/1967 | Luff | 280/652 |
| 3,829,113 | A | * | 8/1974 | Epelbaum | 280/30 |
| 3,912,324 | A | | 10/1975 | Troyer | |
| 4,363,496 | A | * | 12/1982 | Schreiner | 280/47.35 |
| 4,449,750 | A | * | 5/1984 | Pultman | 312/235.2 |
| 4,484,755 | A | | 11/1984 | Houston | |
| 4,491,257 | A | * | 1/1985 | Ingles | 224/407 |
| 4,503,925 | A | | 3/1985 | Palmer | |
| 4,706,975 | A | | 11/1987 | Arena et al. | |
| 4,809,996 | A | * | 3/1989 | Freyman | 280/5.32 |
| 4,946,058 | A | * | 8/1990 | Stamm | 220/23.83 |
| D324,504 | S | * | 3/1992 | Olsen | D12/133 |
| 5,294,027 | A | | 3/1994 | Plastina | |

(Continued)

FOREIGN PATENT DOCUMENTS

DE 3335238 A1 * 4/1984

(Continued)

*Primary Examiner*—J. Allen Shriver, II
*Assistant Examiner*—Brodie Follman
(74) *Attorney, Agent, or Firm*—Palomar Patent; Calif Tervo; Mary Jo Redman

(57) ABSTRACT

Cargo cart 10 can be used independently or attached to a conventional walker 101. Cooperative attach means 40 connect cart 10 in front of walker 101 through roll leader 44, which propels and steers cart 10 in response to user's control of walker 101. In attached mode, rear wheels 34 of cart 10 are suspended above travel surface to allow cart 10 to be steered easily and predictably by roll leader 44. Cart 10 is attached and detached with one hand without tools. Handle 50 and optional cargo basket 29 fold flat for storage. Slots in peripheral rails 24 retain cargo that is wider than cargo support 28.

2 Claims, 3 Drawing Sheets

U.S. PATENT DOCUMENTS

| | | | |
|---|---|---|---|
| 5,364,120 A | 11/1994 | Shimansky | |
| D370,877 S * | 6/1996 | Trujillo | D12/133 |
| 5,531,238 A * | 7/1996 | Azzarelli et al. | 135/66 |
| 5,553,877 A * | 9/1996 | Huang | 280/33.997 |
| 5,581,915 A * | 12/1996 | Lobato | 37/285 |
| 5,647,602 A | 7/1997 | Nevin | |
| 5,653,458 A * | 8/1997 | Chaparian | 280/30 |
| 5,662,342 A * | 9/1997 | Basharat | 280/33.997 |
| 5,848,797 A | 12/1998 | Paez | |
| 6,086,315 A * | 7/2000 | Poindexter et al. | 414/549 |
| 6,135,480 A | 10/2000 | James | |
| 6,364,326 B1 * | 4/2002 | Reiland et al. | 280/33.993 |
| 6,375,202 B2 * | 4/2002 | Weck et al. | 280/47.35 |
| 6,401,996 B1 * | 6/2002 | Thom et al. | 224/407 |
| 6,536,786 B1 * | 3/2003 | Katoozian | 280/33.993 |
| 6,672,321 B2 * | 1/2004 | Hamilton | 135/67 |
| 6,685,200 B1 * | 2/2004 | Giannoni et al. | 280/47.35 |
| 6,702,313 B2 | 3/2004 | Forshee et al. | |
| 6,827,364 B1 * | 12/2004 | Martin | 280/641 |
| 6,910,710 B2 * | 6/2005 | Nguyen | 280/651 |
| 7,093,841 B2 | 8/2006 | Conrad | |
| 7,226,059 B1 * | 6/2007 | Samuels | 280/33.992 |
| 7,338,054 B2 * | 3/2008 | Pint | 280/79.2 |
| 7,370,660 B2 * | 5/2008 | Hamilton et al. | 135/67 |
| 7,407,170 B1 * | 8/2008 | Williams | 280/33.996 |
| 7,597,332 B2 * | 10/2009 | Thompson | 280/47.38 |
| 7,628,411 B2 * | 12/2009 | Meyers et al. | 280/87.021 |
| 7,644,937 B2 * | 1/2010 | Giampavolo et al. | 280/33.991 |
| 2002/0171214 A1 * | 11/2002 | Prather | 280/47.35 |
| 2003/0127121 A1 * | 7/2003 | Hamilton | 135/67 |
| 2003/0205873 A1 * | 11/2003 | Orozco | 280/33.991 |
| 2003/0205875 A1 * | 11/2003 | Ondrasik et al. | 280/47.34 |
| 2004/0000773 A1 | 1/2004 | Li | |
| 2004/0129305 A1 * | 7/2004 | Hamilton et al. | 135/67 |
| 2005/0040614 A1 * | 2/2005 | Johnson et al. | 280/33.991 |
| 2005/0156406 A1 * | 7/2005 | Prather | 280/651 |
| 2005/0225045 A1 * | 10/2005 | Schmid | 280/33.992 |
| 2006/0097487 A1 * | 5/2006 | Stuart et al. | 280/651 |
| 2007/0283990 A1 * | 12/2007 | Fernandez et al. | 135/67 |
| 2008/0190947 A1 * | 8/2008 | Bourgraf | 220/737 |
| 2008/0279665 A1 * | 11/2008 | Stepanians | 414/542 |
| 2009/0020575 A1 * | 1/2009 | Katchen et al. | 224/407 |
| 2009/0058024 A1 * | 3/2009 | Cagan et al. | 280/33.991 |

FOREIGN PATENT DOCUMENTS

| | | | |
|---|---|---|---|
| DE | 10105319 A1 * | 9/2001 | |

* cited by examiner

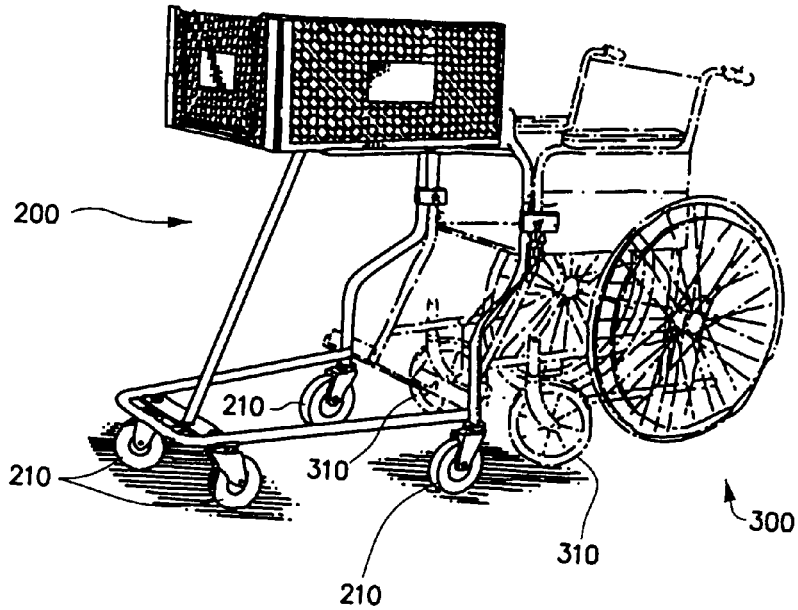
FIG. 1
PRIOR ART
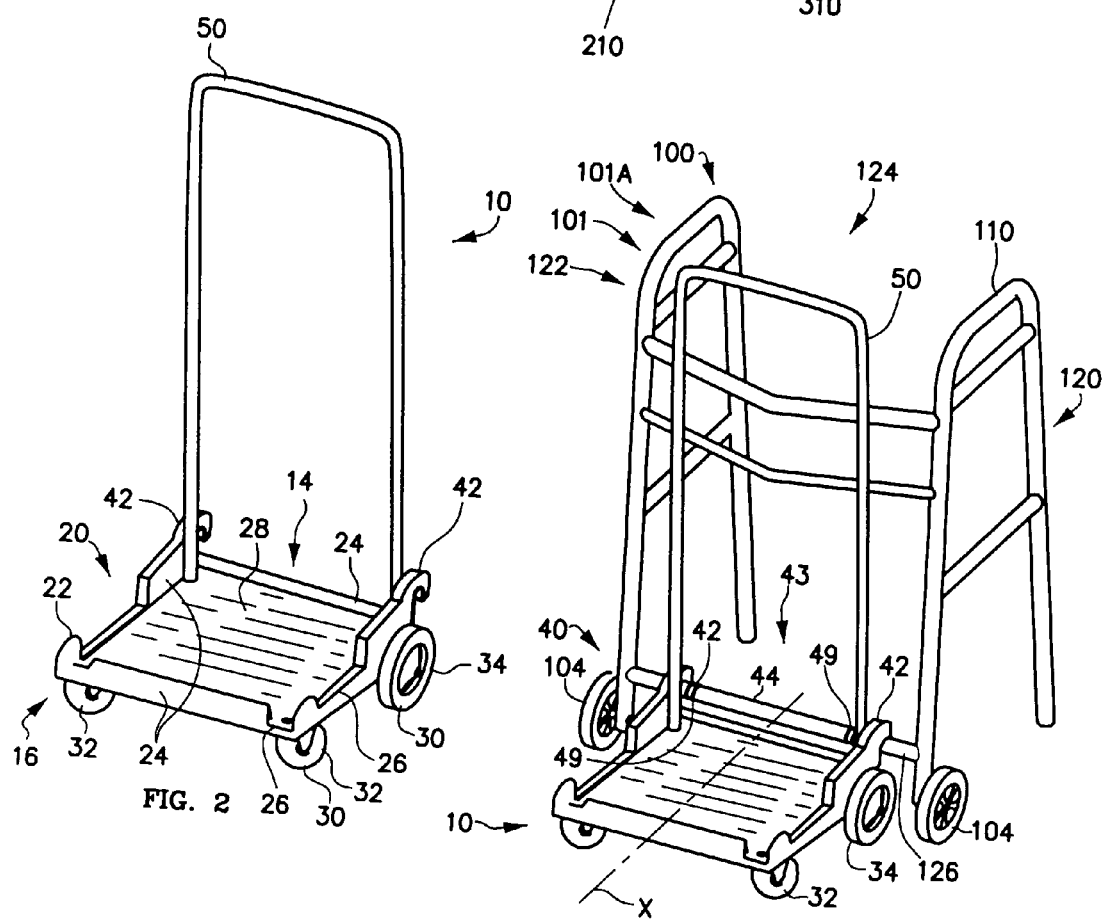
FIG. 2
FIG. 3

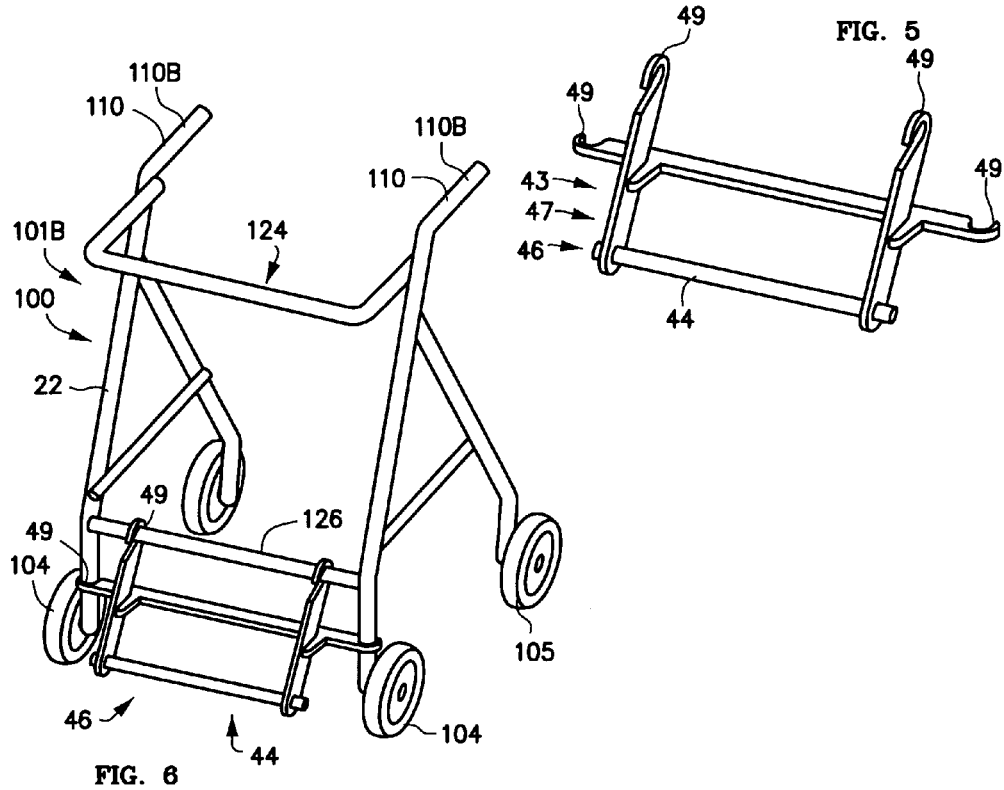
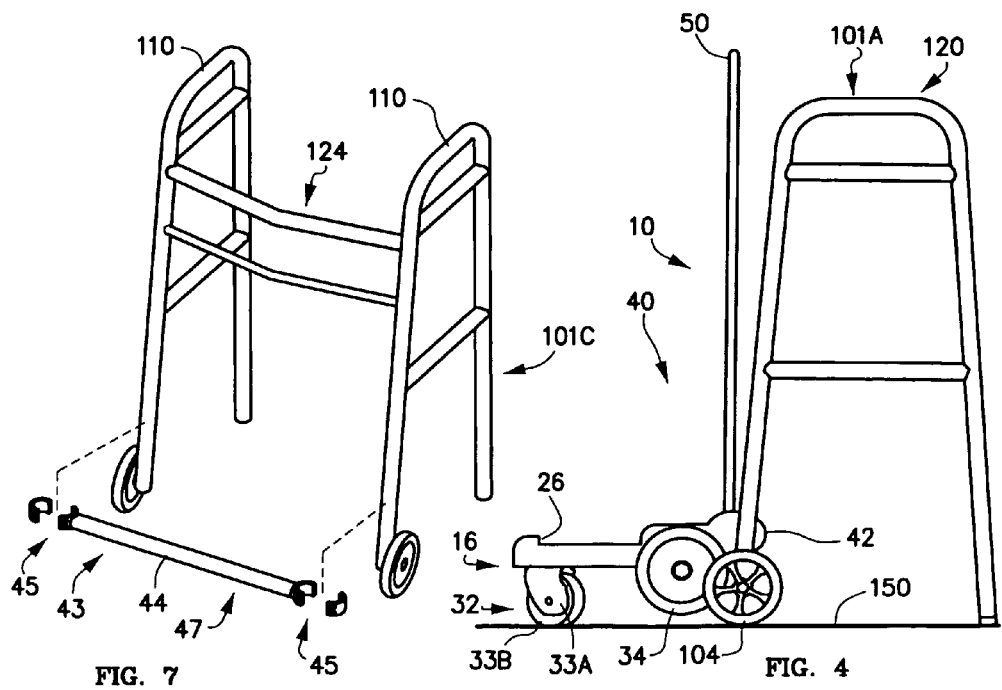

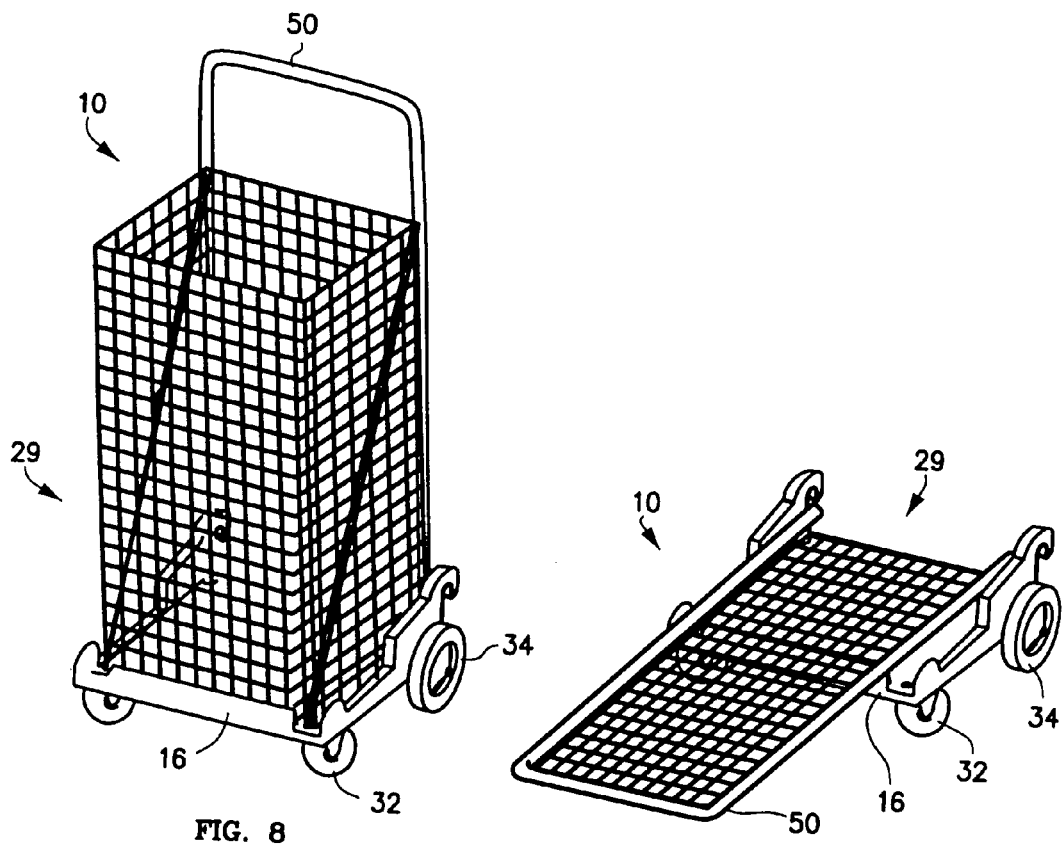
FIG. 8
FIG. 9
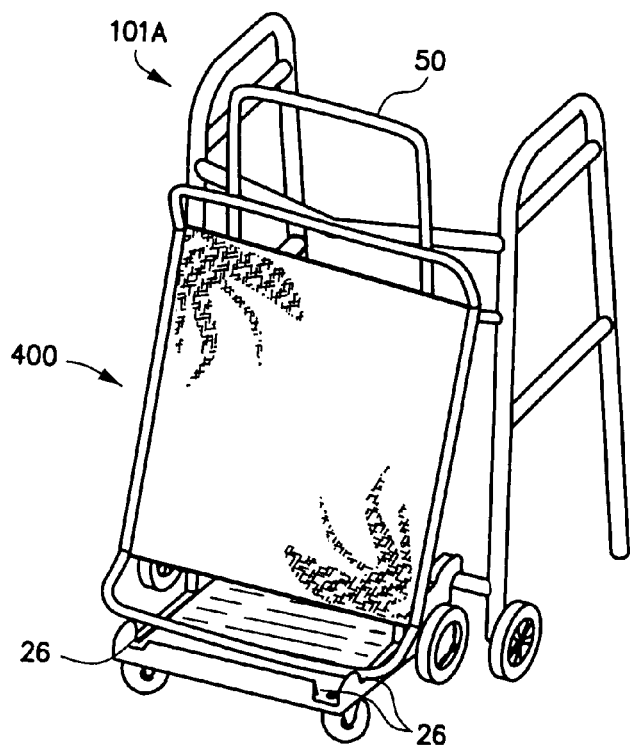
FIG. 10

CARGO CART FOR WHEELED MOBILITY DEVICE

FIELD OF THE INVENTION

This invention relates to carts propelled and controlled by a user, and more specifically to cargo carts that can be attached to a mobility device.

BACKGROUND OF THE INVENTION

Many people who have balance problems or weak muscles use some type of mobility device, such as an electric scooter or walker frame. These mobility devices typically require the user to use both hands to operate the device. The user steers the mobility device and either pushes the device with both hands or uses the hands to operate mechanical throttle and brake controls.

Because the user does not have a hand free for carrying any objects, such mobility aids frequently have some article carrier attached to it. Scooters often have a bicycle type basket mounted between the handlebars. Walker frames may have a tray, basket, or pouch attached to the frame. Users of walker frames with seats often place articles on the seat for transport.

Such article carrying containers are limited in size and lend themselves to transport of articles of only certain shapes and sizes. The carrying containers are typically attached to the upper part of the mobility device such that carrying heavy items can make the mobility device easier to overturn and harder to steer. Articles placed on a seat often fall off.

Thus, there is a need for a cart that users of mobility devices can use to safely carry larger and more awkwardly shaped articles than can be carried in conventional baskets, trays, or pouches.

Various attempts to create carts for use with wheelchairs have been made. One of the more practical-appearing examples is U.S. Pat. No. 4,484,755 of Houston. One embodiment of Houston's cart is included in the drawings herein as FIG. 1, labeled "Prior Art."

Houston's cart 200 is supported by four wheels 210 and is attached to the front of a wheelchair 300 or walker frame (not shown). The axles of all four wheels 210 of cart 200 and the front pair of wheels 310 of wheelchair 300 are offset from the attachment points of wheels 210,310 such that all three pairs of wheels 210,310 are freely pivoting. This arrangement will likely result in unpredictable steering of the cart and wheelchair combination.

Houston does not describe the detailed means by which the user of wheelchair 300 steers cart 200. FIG. 1 shows that the cart and wheelchair combination includes three pairs of pivoting casters 210, 310 in series. The user of wheelchair 300 may need to use "opposite" steering, such as used by the driver of an auto with attached trailer to back up. Actually, the steering is likely to be far more unpredictable than simple opposite steering and the wheelchair/cart combination may tend to lock up during a complicated maneuver, such as a three-point turn in a grocery store aisle.

If Houston's cart 200 were attached to a walker frame with pivoting front wheels, the situation would be the same. Either the cart would swing unpredictably in response to steering of the walker, or the user would need to apply opposite steering and initially move in the direction opposite the turn.

Houston also discloses an embodiment of the cart attached to a walker frame without wheels (not shown). It appears the user of the walker would have to lift the walker and use the elevated walker frame to steer the Houston cart. This would potentially require more muscle power and agility than a typical user of a mobility aid device has, as well as putting the user off-balance with each change of direction.

The Houston cart 200 of FIG. 1 elevates the basket portion well above the castered chassis. The Houston cart 200 clearly has a very high center of gravity; when loaded with articles it could be dangerously top heavy.

Other cargo-carrying carts for use in combination with wheelchairs have been patented. Most of them would not be feasible to use with a walker frame or scooter. None appear to be capable of being steered safely and intuitively by a person using a walker frame.

Thus, there is a need for a safe, convenient cart that can be attached to a mobility aid device, including an electric scooter, a wheelchair, or a walking frame. There is a need for a cart that can be propelled and steered easily by a fragile or even easily-confused person using a mobility device. There is a need for a cart that has a low center of gravity whether empty or heavily loaded and that will not tip. There is a need for a cart that can securely carry a variety of large or oddly-shaped articles. There is a need for a cargo cart that can be easily detached from the mobility device when not needed, that can be stored conveniently, and that can even be used independently of the mobility device.

SUMMARY OF THE INVENTION

The present invention is a cargo cart that can be attached to a mobility device, in particular a walker frame with wheels, often simply called "a walker.". The cart can be attached and detached from the walker by the user, using one hand and without bending over. When detached from the walker, the cart can be used as a conventional hand truck or folded for storage.

The cart includes a cargo platform that is supported close to the floor by a pair of freely swiveling casters in front and a pair of non-swiveling wheels in back. A handle extends upwardly from the back end of the cart.

The back end of the cart can be attached to a walker so that the walker propels and controls the movement of the cart. The attachment means is adapted to support the back wheels of the cart slightly above the floor so that they do not interfere with the steering of the cart supported on the casters.

The user pushes and steers the walker in the accustomed manner. This movement and steering is transferred through the attachment to the cart so as to steer the cart in the same direction as the walker.

When the cart is not attached to a walker, it may be used as a hand truck, such as by pulling the cart by the handle. Thus, the cart can be used by others in the household of the user of the walker frame for various tasks. In this mode of use, the cart steers better if it is pulled so that the non-swiveling wheels precede the casters.

The cargo platform may be adapted so that it can accept many shapes of articles. For example, the platform is preferably surrounded by a rail to retain small articles. The rail preferably includes slots or protrusions to aid in holding items that are wider than the platform. Specialized article holders may be added, such as an optional tall basket for holding laundry or an insert with deep wells to hold pitchers and glasses of beverage.

The handle of the cart is adapted for folding flat for storage of the cart under a bed or hanging on a wall. The optional tall basket is adapted for folding flat along with the handle.

The features and advantages of the invention will be readily understood when the detailed description thereof is read in conjunction with the drawings wherein like reference numerals refer to like parts throughout.

BRIEF DESCRIPTION OF THE DRAWINGS

FIG. 1 is a prior art shopping cart and wheelchair combination from the patent of Houston.

FIG. 2 is a left front perspective view of the cart of the present invention.

FIG. 3 is a front perspective view of the cart of FIG. 2 attached to a conventional mobility device.

FIG. 4 is a left side elevation view of the cart and mobility device combination of FIG. 3, the right side being a mirror image.

FIG. 5 is a left front perspective view of a preferred embodiment of attachment means for the cart of FIG. 2.

FIG. 6 is a left front perspective view of the attachment means of FIG. 5 mounted on an alternative conventional wheeled walker.

FIG. 7 is a front exploded perspective view of an alternative preferred embodiment of attachment means for the cart of FIG. 2, in combination with an alternative conventional wheeled walker.

FIG. 8 is a left front perspective view of an alternative embodiment of the cart of the present invention, including a tall basket for holding cargo.

FIG. 9 is a left front perspective view of the cart of FIG. 8, shown in a folded position.

FIG. 10 is a left front perspective view of the cart and walker frame combination of FIG. 3, showing a conventional folding chair carried as cargo.

DETAILED DESCRIPTION OF THE INVENTION

FIG. 2 is a left front perspective view of the cart 10 of the present invention. FIG. 3 is a front perspective view of cart 10 of FIG. 2 attached to a conventional mobility device 100 such as a walker frame 101, such as two-wheeled walker 101A. FIG. 4 is a left side elevation view of cart 10 and walker 101A combination of FIG. 3.

Cart 10 generally includes a first end 14 defining a first direction of travel, a second end 16 defining a second direction of travel, cargo portion 20 between first end 14 and second end 16, wheels 30, attachment means 40 for attaching cart 10 to walker 101, and a handle 50 attached to first end 14.

First end 14 and second end 16 define a longitudinal axis x of the cart 10 stretching between them. Cart 10 has a first and a second direction of travel, as shown in FIG. 4.

Cargo portion 20 includes frame 22 with peripheral rails 24 and cargo support area 28 enclosed within rails 24. Frame 22 is generally rectangular and includes rails 24 on all four edges. Rails 24 add strength to frame 22 and prevent cargo from rolling or sliding off of cargo support 24.

Wheels 30 are attached to frame 22 of cargo portion 20. Wheels 30 typically include a pair of non-pivoting wheels 34 attached to opposing sides of frame 22 near first end 14 such that the axis of rotation of each wheel 34 is perpendicular to longitudinal axis x.

Wheels 30 further include one or more casters 32 attached to frame 22 near second end 16. Caster 32 is a conventional pivoting roller including an offset bracket 33A and rolling member 33B. Offset bracket 33A is free to pivot at least 180° about a vertical axis. Rolling member 33B is rotatably mounted in offset bracket 33A with a horizontal axis of rotation. Because the pivot axis and rotation axis of caster 32 are offset, rolling member 33B has many degrees of freedom for traveling upon travel surface 150.

Preferably, one caster 32 is attached to each of the opposing sides of frame 22 to which a non-pivoting wheel 34 is attached. If cart 10 has four wheels 30 attached at four corners of a generally rectangular frame 22, the carrying capacity of cart 10 is maximized and cart 10 will not easily tip over when loaded.

Handle 50 is attached to frame 22 near first end 14. Handle extends upwardly from frame 22 to a height that is convenient for a user to grasp. Handle 50 may be a U-shaped frame as depicted in the drawings, a single upright shaft, or any other convenient arrangement. Handle 50 is preferably narrow in side profile so as to not interfere with walker 101 when cart 10 is attached.

The preferred embodiment of handle 50, attached near first end 14, as shown in the drawings, provides a secondary benefit of acting as a safety screen to help stabilize loaded cargo and prevent items being carried on cart 10 from falling through the frame of walker 101 and striking or tripping a user.

Handle 50 is used to pull and steer cart 10, preferably in the first direction of travel, when cart 10 is unattached to walker frame 101. Preferably, handle 50 can be shortened for storage of cart 10 when not in use. Handle 50 may be adapted to fold flat over cargo portion 20, telescope downward to a low height, or even be removed from frame 22.

FIGS. 3 and 4 illustrate cart 10 attached to a walker 101A that includes left side 120, right side 122, and center section 124 connecting right and left sides 120, 122.

Cart 10 is selectively attachable to any walker 101 with cooperative attachment means 40. Attachment means 40 typically includes two cooperating components: cart attachment means, which is typically an integral part of frame 22, such as hook means such as hooks 42, and walker attachment means 43.

Walker attachment means 43 typically includes a horizontal roll leader 44 that engages with hooks 42. As seen in FIG. 3, center section 124 of walker 101A includes a lower crossbar 126. Lower crossbar 126 is in the desired range of 5⅜ to 5⅝ inches above travel surface 150, so crossbar 126 is well adapted for use as roll leader 44.

Cart 10 is attached to walker 101A by positioning hooks 42 close to roll leader 44 and pulling upward on handle 50, preferably with no cargo loaded in cart 10. Handle 50 is manipulated to engage hooks 42 with roll leader 44. This operation may be performed with only one hand, so that one hand can remain on walker 101A for support or balance. The user does not need to bend over to see or manipulate small fittings.

As best seen in FIG. 4, when hooks 42 are engaged with roll leader 44, first end 14 of cart 10 is attached to walker frame 101A and non-pivoting wheels 34 are supported about 0.5 inch above travel surface 150. Supporting non-pivoting wheels 34 above travel surface 150 simplifies steering of the combination of cart 10 with walker 101, as will be explained below.

To use cart 10 with a walker 101 that does not have an appropriate existing feature to use as roll leader 44, an adaptor bracket 47 is removably mounted upon walker 101 to adapt it for attachment to hooks 42.

FIGS. 6 and 7 depict alternative walker frames 101. FIG. 6 shows a walker frame 101B with two front wheels 104 and two rear wheels 105.

Walker frame 101A of FIGS. 3, 4, and 10 and walker frame 101B of FIG. 6 are controlled by gripping control means 110 of walker frame 101, such as the uppermost portions of left and right sides 120,122 of walker frame 101A or walker frame 101B. Walker frame 101C of FIG. 7 is controlled by handlebars 110B.

The user propels walker frame 101 by pushing or pulling control means 110 and steers by applying differential pressure to left and right control means 110. The differential pressure causes the pair of front wheels 104 to turn toward the desired direction. The rear wheels 105 of walker frame 101B respond, as do casters 32 of cart 10. Both the propulsion and the steering are directly transferred from control means 110 through roll leader 44 to cart 10.

If non-pivoting wheels 34 were left in contact with travel surface 150 when cart 10 is attached to walker 101, the multiple pairs of wheels would confuse the direction of steering. In some cases, the user might need to steer walker 101 in the opposite direction from the direction desired in order to steer cart 10 in the direction desired. In some cases, non-pivoting wheels 34 might get into an orientation that would require forward-and-backward shuffling of walker 101 to get straightened out, or might require excessive force from the user to overcome.

Because the cargo cart 10 of the present invention supports non-pivoting wheels 34 above travel surface 150 when attached to walker 101, casters 32 follow front wheels 104 of walker frame 101 easily and predictably.

FIG. 5 is a front perspective view of an alternative preferred embodiment of walker attachment means 43, adapter bracket 47 such as drop bracket 46. Drop bracket 46 is for adapting walker 101B to cooperate with hooks 42. Drop bracket 46 includes roll leader 44 and mount means to mount drop bracket 46 on walker 101B, such as plurality of hooks 49. FIG. 6 is a front perspective view of drop bracket 46 of FIG. 5 mounted on walker 101B.

Roll leader 44 is a preferred height above travel surface 150. Hooks 42 can then be dropped onto roll leader 44 as described above.

FIG. 7 is a front perspective, exploded view of an alternative preferred embodiment of adapter bracket 47, such as crosstie 48, for adapting conventional walker 101C for attachment to cart 10. Crosstie 48 includes roll leader 44 and mounting means such as clamps 45. Clamps 45 are used to mount crosstie 48 on walker 101C at a desired height for engaging with hooks 42.

It can be seen that many designs of walker 101 can be adapted for use with cart 10 by mounting an appropriate adaptor bracket 47. Preferred features of a appropriate walker adaptor bracket 47 are that it provide an attachment point such as roll leader 44 that will support non-pivoting wheels 34 at the preferred height when attached, that adaptor bracket 47 is easy to mount on walker 101, that cart 10 is easy to attach to adaptor bracket 47 with one hand and without bending, and that adaptor bracket 47 does not impede the normal use of walker 101, such that it will not be necessary to remove adaptor bracket 47 after every use of cart 10.

Cooperative attachment means 40 has been described and illustrated herein as comprising a pair of hooks 42 for mounting upon a horizontal crossbar 126 or roll leader 44. It will be apparent that many forms of mechanical attachment as are well known are feasible for use as cooperative attachment means 40.

For example, hooks 42 may alternatively comprise a single half tube attached to first end 14 and opening downwardly, that engages roll leader 44.

Roll leader 44 may include centering means, such as protrusions 49 on roll leader 44, as shown in FIG. 3. FIG. 3 shows cart 10 attached to a walker 101A that has an appropriate existing feature (crossbar 126) that functions as roll leader 44.

Protrusions 49 are preferably thick flexible rings that can be mounted on roll leader 44 or may be simply bands of friction tape wrapped around roll leader 44.

Cargo cart 10, as shown in FIGS. 2, 3, and 4, includes exemplary adaptations for supporting large cargo such as features 26, various recesses or protrusions of rails 24. Features 26 may be used for retaining a variety of cargoes, and may also be specially adapted for certain frequently carried items. FIG. 10 shows cart 10 supporting a folding chair 400. Although folding chair 400 is wider than cargo support 28, features 26 hold the frame of folding chair 400 securely.

Other adaptations for retaining cargo are also possible. FIGS. 8 and 9 show cargo cart 10 with a tall basket 29, such as could hold laundry or long-handled household cleaning tools. Basket 29 folds flat for storage, as seen in FIG. 9. An alternative preferred embodiment, not shown, includes a closeable removable case adapted to fit snugly within rails 24.

An alternative embodiment, envisioned but not illustrated, has handle 50 attached to second end 16 of cart 10. This embodiment would have the potential advantage of making cart 10 easier to use as a pushed handcart in the unattached mode, instead of a pulled cart. This embodiment would have the potential disadvantage of limiting the size of cargo able to be carried by cart 10.

Although particular embodiments of the invention have been illustrated and described, various changes may be made in the form, composition, construction, and arrangement of the parts herein without sacrificing any of its advantages. Therefore, it is to be understood that all matter herein is to be interpreted as illustrative and not in any limiting sense, and it is intended to cover in the appended claims such modifications as come within the true spirit and scope of the invention.

For example, the invention has been mainly described and illustrated herein as being for attachment to a wheeled walker 101. Cart 10 is easily adapted for use with other sorts of mobility device, such as wheelchairs or electric scooters.

We claim:

1. In combination:
   a walker that travels over a surface, including:
      a frame including:
         left and right members for gripping by a user; a low cross bar on a front portion of said walker; and
      at least one wheel supporting said walker frame for traveling over the surface; said cross bar being adjacent and slightly above said at least one wheel; a cart selectively attachable to said walker, including:
      a cart frame including
         a first end; and
         a second end spaced apart from said first end; said first and second ends defining a longitudinal axis therebetween;
      a cargo support connected to said cart frame;
      at least one caster attached to said second end for rollingly supporting said second end on the surface;
      a pair of wheels attached to said first end in a spaced-apart relationship, for rollingly supporting said first end, each said wheel of said pair of wheels having a rotational axis perpendicular to the longitudinal axis; and
      a handle attached to said cart frame; and
   hook means on a bottom portion of said first end of cart for hooking said cross bar of said walker for selectively attaching said cart to said walker such that in the attached position said pair of wheels is supported above and not touching the travel surface and said caster is in contact with the travel surface; such that the act of pushing or pulling by a user on said left and right frame members of said walker results in simultaneously propelling said wheel of said walker and said castors of said cart on the surface, and the act of differentially pushing or pulling by a user on said left and right frame members of said walker results in simultaneously steering said wheel of said walker and rolling said castors of said cart on the surface in the direction steered and such that in the unattached position, said pair of wheels also contacts the travel surface, allowing said cart to be used independently of said walker by a user using said handle to control said cart.

2. In combination:

a walker that travels over a surface, including:
- a frame having a front and a back and including:
  - left and right members for gripping by a user; a low cross bar on a front portion of said walker; and
  - spaced left and right wheels having transverse, horizontal axes for supporting said front of said walker frame for traveling over the surface; said cross bar being adjacent and slightly above said spaced wheels; a cart selectively attachable to said walker, including:
- a cart frame including
  - a first end; and
  - a second end spaced apart from said first end; said first and second ends defining a longitudinal axis therebetween;
- a cargo support connected to said cart frame;
- at least one caster attached to said second end for rollingly supporting said second end on the surface;
- a pair of wheels attached to said first end in a spaced-apart relationship, for rollingly supporting said first end, each said wheel of said pair of wheels having a rotational axis perpendicular to the longitudinal axis; and
- a handle attached to said cart frame; and hook means on a bottom portion of said first end of cart for hooking said cross bar of said walker for selectively attaching said cart to said walker such that in the attached position said pair of wheels is supported above and not touching the travel surface and said caster is in contact with the travel surface; such that the act of pushing or pulling by a user on said left and right frame members of said walker results in simultaneously propelling said wheel of said walker and said castors of said cart on the surface, and the act of differentially pushing or pulling by a user on said left and right frame members of said walker results in simultaneously steering said wheel of said walker and rolling said castors of said cart on the surface in the direction steered and such that in the unattached position, said pair of wheels of said cart also contacts the travel surface, allowing said cart to be used independently of said walker by a user using said handle to control said cart.

* * * * *